United States Patent
Cho et al.

(10) Patent No.: US 6,473,256 B2
(45) Date of Patent: *Oct. 29, 2002

(54) METHOD AND APPARATUS FOR A 200 NS WRITE TO READ SWITCH TIME CIRCUIT

(75) Inventors: Hae-Seok Cho, Irvine, CA (US); Indumini Ranmuthu, Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 132 days.

(21) Appl. No.: 09/212,753

(22) Filed: Dec. 16, 1998

(65) Prior Publication Data

US 2001/0015865 A1 Aug. 23, 2001

Related U.S. Application Data

(60) Provisional application No. 60/080,983, filed on Apr. 7, 1998.

(51) Int. Cl.[7] .......................... G11B 15/12; G11B 5/09; G11B 5/02
(52) U.S. Cl. .............. 360/62; 360/46; 360/67
(58) Field of Search ................ 360/46, 62, 67

(56) References Cited

U.S. PATENT DOCUMENTS

| | | | | |
|---|---|---|---|---|
| 4,644,253 A | * | 2/1987 | Libert | 323/275 |
| 5,204,789 A | * | 4/1993 | Jove et al. | 360/67 |
| 5,296,975 A | | 3/1994 | Contreras et al. | |
| 5,563,501 A | * | 10/1996 | Chan | 323/282 |

* cited by examiner

Primary Examiner—Regina N. Holder
(74) Attorney, Agent, or Firm—W. Daniel Swayze, Jr.; W. James Brady; Frederick J. Telecky, Jr.

(57) ABSTRACT

The present invention includes a circuit which can achieve a 200 nano second write to read time. The present invention eliminates a switch in the RMR measurement circuit.

3 Claims, 2 Drawing Sheets

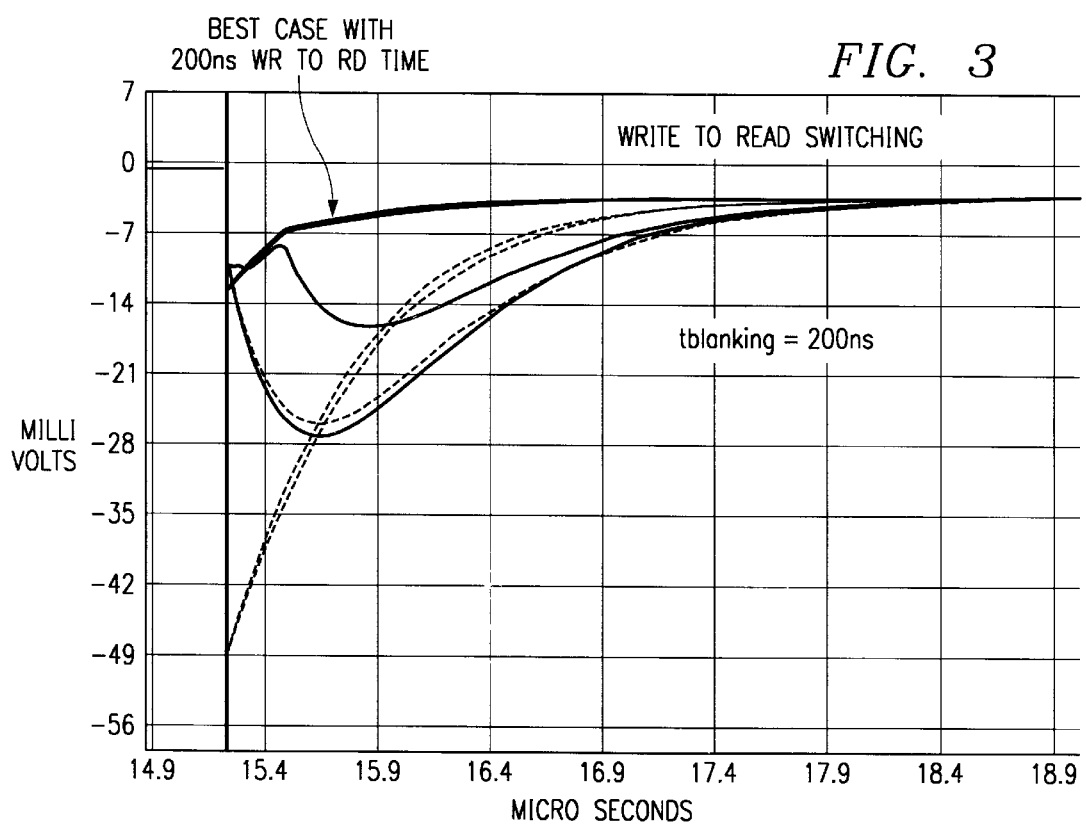

METHOD AND APPARATUS FOR A 200 NS WRITE TO READ SWITCH TIME CIRCUIT

This application claims priority under 35 USC § 119(e)(1) of provisional application Ser. No. 60/080,983, filed Apr. 7, 1998.

TECNICAL FIELD OF THE INVENTION

The present invention relates to disc drive systems and more particularly for devices for a write to read switching circuit.

BACKGROUND OF THE INVENTION

Magnetic disc drives have read/write heads out of which the write head portion is used for writing data to magnetic discs and the read head portion is used for reading data from the magnetic disc. During a write operation, a write signal is provided to a selected write head from a write control circuit. The write signal represents data to be encoded into the magnetic disc. More particularly, the write head receives encoded digital data from a "channel" circuit. The transitions of the signal received from the channel circuit causes the write current flowing within the write head to reverse direction which in turn, induces a flux reversal in the magnetized material of the medium of the magnetic disc.

During a read operation, the read head senses flux reversals from the magnetic disc. The flux reversals are encoded into magnetic disc during the write operation. Based on the flux reversals, the read head provides a read signal to a read channel. The read circuit amplifies the read signal, and the channel circuit recovers the data. The read circuit then provides the data to a magnetic disc controller for further processing.

Each magnetic disc in a disk drive has a corresponding "head" adjacent to the top and bottom surface of the disc. Thus, there are two heads per stack where N equals the number of disc in a drive. Normally, only one head is active at a given time in order to control these channels. Typically, each channel additionally includes a current path for current to flow to the MR head.

When switching from a write mode when the write circuit is activated to a read mode when a read circuit is activated, a write to read switching circuit is employed to assure that the transitions created by the change from the write mode to the read mode have been eliminated. One of the criterion of a write to read switching circuit is to minimize any delay associated with the write to read switching circuit.

One such write to read switching circuit is illustrated in FIG. 1. This circuit includes a head 100, which is connected to a Rmr measurement circuit 122. The RMR measurement circuit 122 includes a resistor 124 which is coupled to a FET 126 which is coupled to ground. This FET 126 controls the activation of the measurement circuit 122. However, the FET 126 requires a finite amount of time to switch the measurement circuit 122 and introduces noise to the write to read switching circuit. Additionally, the FET 124 shuts off the current to the Rmr measurement circuit 122 during write mode. However, when going. from write to read, the current begins to flow in the Rmr measurement circuit 122 causing a transient in the head circuit 100. This results in a longer time for the current to settle in the Rmr measurement circuit 122 causing additional delay in the write to read time.

Additionally, FIG. 1 illustrates transconductance circuit 114. The lower corner frequency of the reader $F_{cf}$ is set by two poles namely, $G_{m-c}$ and low pass filter pole $P_{LPF}$. These multiple poles with a zero results in the read circuit being less stable causing over shoot, and the transient response of the reader circuit is extended. This over shoot causes substantially larger settling time with the reader resulting in poor write to read time.

Additionally, there is a further problem associated with the transconductance circuit 114. As illustrated in FIG. 1, reference voltage generator 118 output a voltage $V_{ref}$ to transconductance circuit 114. The transconductances circuit 114 inputs and references the reference voltage $V_{ref}$ with respect to internal ground. In contrast, the external resistor 120 is connected to external ground. As a consequence, when the preamplifier goes from a write to read, there is a transient voltage generated in the internal ground. This will alter the voltage $V_{ref}$ which is measured with respect to internal ground. The transient affects the generation of the transconductance circuit 114. Any change in voltage $V_{ref}$ will cause a transient in current I which flows from transconductance circuit 114 to capacitor 116 and to the gate of transistor 102.

SUMMARY OF THE INVENTION

The present invention includes a write to read switching circuit having a switching time of 200 nano seconds. This is because by the invention, the transients which are generated by switch from the write mode to the read mode are significantly reduced. The write to read switching circuit of the present invention eliminates the low pass filter which is connected to a transconductance circuit. Additionally, the present invention eliminates a switch in the Rmr measurement circuit and provides a switchless Rmr measurement circuit. Furthermore, the present invention provides a write to read switching circuit which only uses a internal ground as a reference. More specifically, the write to read switching circuit is directly connected to internal ground through a resistor which is connected to the reference voltage generator.

BRIEF DESCRIPTION OF THE DRAWINGS

FIG. 3 illustrates a diagram illustrating the switching time of the present invention.

DESCRIPTION OF THE INVENTION

Figure 1:
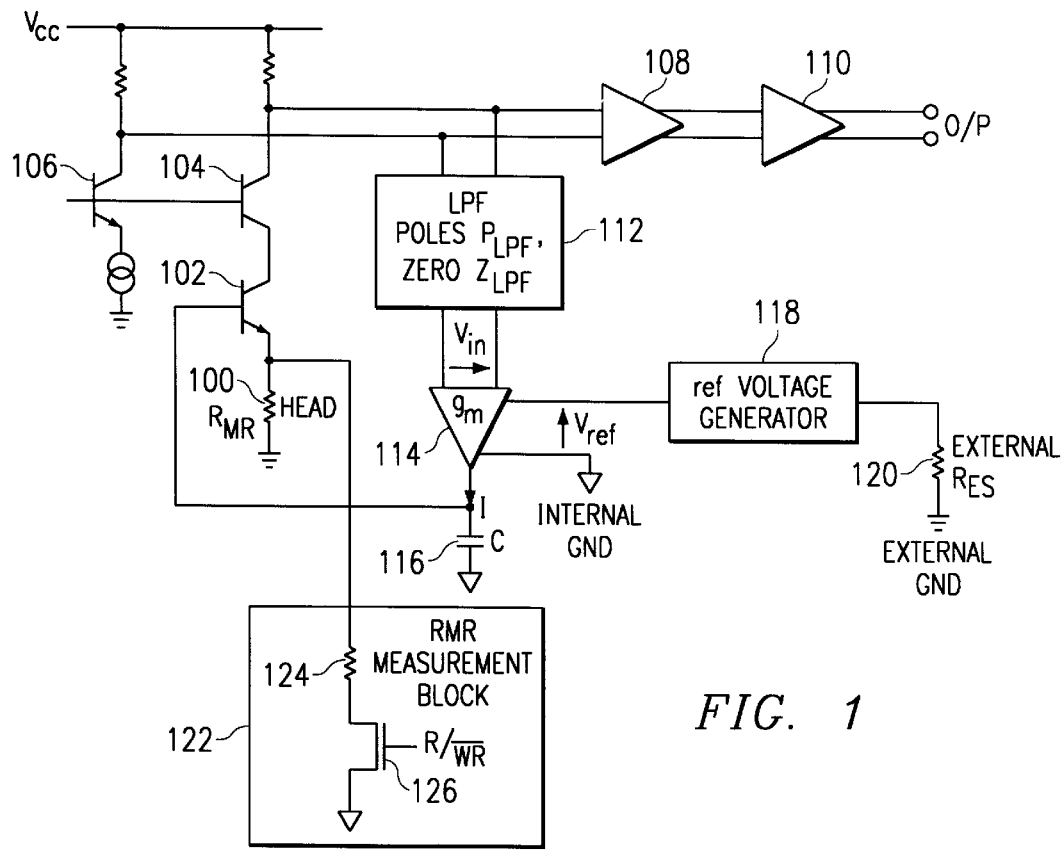
FIG. 1 illustrates a write to read switching circuit with an external ground, a switch in the RMR measurement circuit and a low pass filter.
Figure 2:
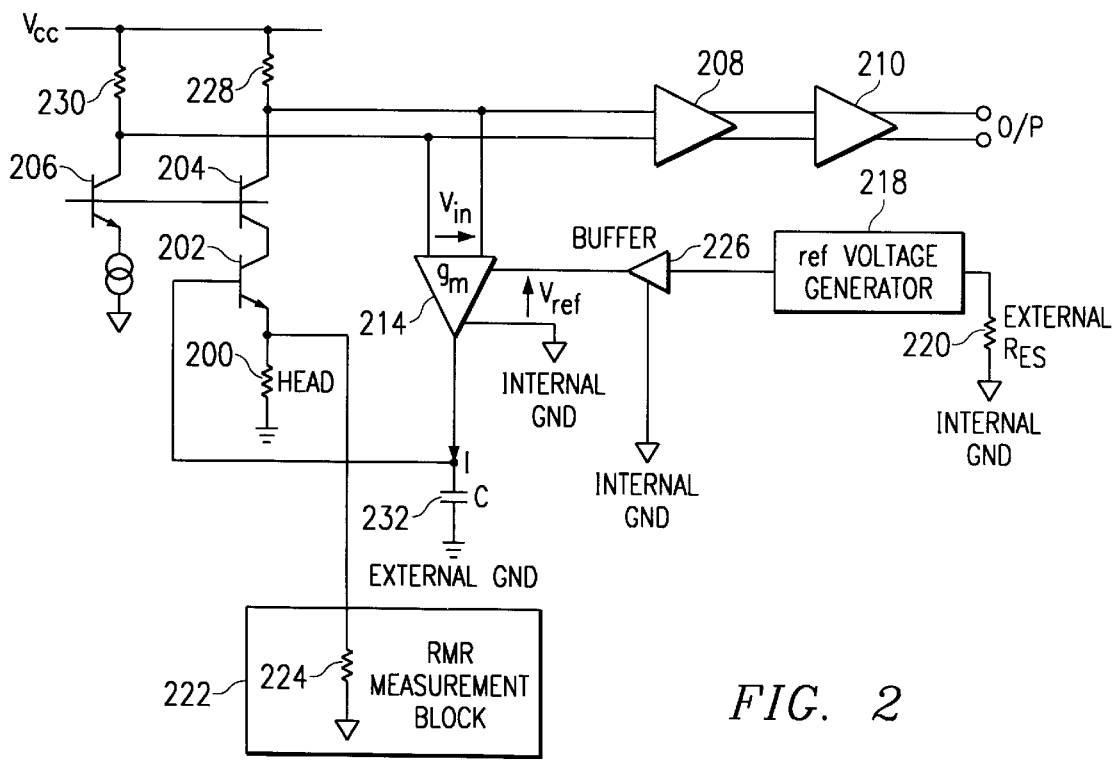
FIG. 2 illustrates a circuit of the present invention.

As illustrated in FIG. 2, resistor 230 is connected to the voltage $V_{cc}$, and resistor 228 is connected to voltage $V_{cc}$. Differential amplifier 208 has a first input connected to resistor 228 and has a second input connected to resistor 230. Each output of amplifier 208 is connected to the first and second input of amplifier 210, respectively. Additionally, a collector of transistor 206 is connected to resistor 230. An emitter of transistor 206 is connected to a current source. The current which is connected to ground. The resistor 228 is connected to a collector of transistor 204. The emitter of transistor 204 is connected to a collector of transistor 202. The emitter of transistor 202 is connect to head circuit 200 which is represented as a resistor. The head circuit 200 is connected to the ground. Additionally, the emitter of transistor 202 is connected to a RMR measurement circuit 222. The RMR measurement circuit 222 includes resistor 224. However, the Rmr measurement circuit 222 does not contain a switch. The gate of transistor 202 is connected to capacitor 232 as well as, the transconductance circuit 214. The capacitor 232 is connected to external ground, and the capacitor 232 is connected to the output of transconductance circuit 214. The input of transconductance circuit 214 is directly connected to the input of differential amplifier 208. The first input of the transconductance circuit 214 is connected to the first input of amplifier 208, and the second input of transconductance circuit 214 is connected to the second input of amplifier 208 Additionally, the resistor 220 is connected to internal ground. Additionally, the other end of resistor 220 is connected to reference voltage generator circuit 218. The reference voltage generator circuit 218 includes an output connected to buffer circuit 226. The buffer circuit 226 is connected to internal ground to reference to internal ground. The output of buffer circuit 226 is connected to transconductance circuit 214. The transconductance circuit 214 is directly connected to the amplifier 208 and between resistors 230 and the collector of transistor 206 and between resistor 228 and the collector of the transistor 204. As a result of the resistor 220 being directly connected to internal ground, disturbances in the external ground do not affect the switching time. A result of the Rmr measurement circuit 222 having no switch; the current through the RMR measurement 222 is not disturbed. The transconductance circuit 214 is directly connected to the resistors 230 and 228 resulting in only one pole for the write to read switching circuit. A switching time of the write to read switching circuit is 200 nano seconds. The presence of any of these elements results in a reduction in the write to read switching time.

FIG. 3 illustrated a curve with a read to write switching time of 200 nano seconds. This curve was achieved with the circuit of FIG. 2.

During waiting and write to read transition, head circuit 200 picks up a glitch which generates a voltage from the emitter of transistor 202 with a respect to ground. This increases the voltage from resistor 228 to transistor 202 which causes a difference in voltage across the input of amplifier 208. The transconductance circuits 204 has a voltage potential across the inputs that consequently causes a current to be sunk by the transconducted circuit 214. This current flows from capacitor 232 which cause voltage in capacitor 232 to decrease. This reduces voltage across the head circuit 200 reduces the voltage difference across the amplifier 208 output. For above to happen smoothly without any ringing, a one pole write to read circuit is required. The present invention has only one pole $G_{-MC}$. Additionally, the circuit is not connected to external ground. Furthermore, the circuit has a RMR measurement circuit with no switch. These give the fast 200 ns write to read switching time.

What is claimed is:

1. A write to read switching circuit to switch from a write mode to a read mode comprising:

a head circuit to write and read information;

an amplifier connected to said head circuit, a transconductional circuit directly connected to said amplifier, said transconductional circuit including a single pole, a reference generate circuit connected to internal ground, and a measurement circuit connected to said head circuit; wherein said head circuit switches from said write mode to said read mode.

2. A write to read switching circuit to switch from a write mode to a read mode as in claim 1, wherein said write to read switching circuit further comprises a buffer circuit being connected between said transconductional circuit and said reference generate circuit.

3. A write to read switching circuit to switch from a write mode to a read mode as in claim 2, wherein said buffer circuit indirectly connected to said internal ground.

* * * * *